(12) United States Patent
Li et al.

(10) Patent No.: US 11,625,454 B2
(45) Date of Patent: Apr. 11, 2023

(54) METHOD AND DEVICE FOR 3D SHAPE MATCHING BASED ON LOCAL REFERENCE FRAME

(71) Applicant: SHENZHEN UNIVERSITY, Guangdong (CN)

(72) Inventors: Dong Li, Guangdong (CN); Sheng Ao, Guangdong (CN); Jindong Tian, Guangdong (CN); Yong Tian, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 17/042,417

(22) PCT Filed: Dec. 9, 2019

(86) PCT No.: PCT/CN2019/124037
§ 371 (c)(1),
(2) Date: Sep. 28, 2020

(87) PCT Pub. No.: WO2021/114026
PCT Pub. Date: Jun. 17, 2021

(65) Prior Publication Data
US 2022/0343105 A1    Oct. 27, 2022

(51) Int. Cl.
*G06F 18/22* (2023.01)
*G06T 7/62* (2017.01)
*G06T 3/00* (2006.01)

(52) U.S. Cl.
CPC ............ *G06F 18/22* (2023.01); *G06T 3/0012* (2013.01); *G06T 7/62* (2017.01)

(58) Field of Classification Search
CPC ......... G06T 3/0012; G06T 7/62; G06T 17/00; G06T 17/30; G06T 7/00; G06K 9/6201
See application file for complete search history.

(56) References Cited

U.S. PATENT DOCUMENTS 9,390,552 B1 * 7/2016 Huang ................... G06T 17/00
10,186,049 B1 * 1/2019 Boardman ............... G06T 7/55
(Continued)

FOREIGN PATENT DOCUMENTS

| CN | 105160344 A | 12/2015 |
| CN | 106780459 A | 5/2017 |

(Continued)

OTHER PUBLICATIONS

International Search Report and Written Opinion of the International Searching Authority, issued in PCT/CN2019/124037, dated Aug. 24, 2020; ISA/CN.

*Primary Examiner* — Ming Wu
(74) *Attorney, Agent, or Firm* — Brooks Kushman P.C.

(57) ABSTRACT

A method and a device for 3D shape matching based on a local reference frame are proposed. After acquiring a 3D point cloud and feature points in the method, the feature point set is projected to a plane, and feature transformation is performed on the projected points by using at least one factor from the distances between the 3D points and the feature points, the distances between the 3D points and the projected points, and the average distances between the 3D points and its 1-ring neighboring points to acquire a point distribution with a larger variance in a certain direction than the projected point set, and the local reference frame is determined based on the transformed point distribution. The 3D local feature descriptor established based on this local reference frame can encode the 3D local surface information more robustly, so as to obtain a better 3D shape matching effect.

20 Claims, 3 Drawing Sheets

(56) References Cited

U.S. PATENT DOCUMENTS

2017/0243397 A1* 8/2017 Hou .................. G06V 10/7553
2017/0316597 A1* 11/2017 Ceylan .................... G06T 17/00

FOREIGN PATENT DOCUMENTS

| CN | 107274423 A | 10/2017 |
| CN | 109215129 A | 1/2019 |
| CN | 110211163 A | 9/2019 |
| CN | 110335297 A | 10/2019 |
| KR | 20090092486 A | 9/2009 |

* cited by examiner

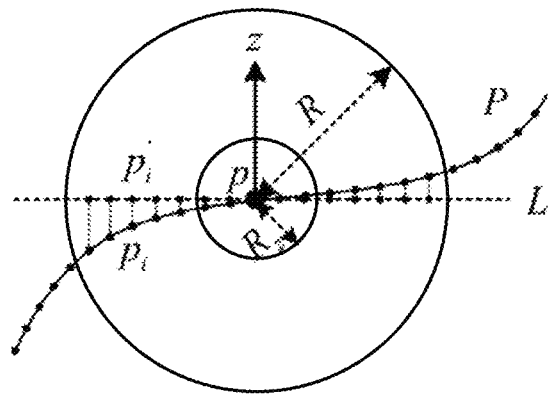

FIG. 3

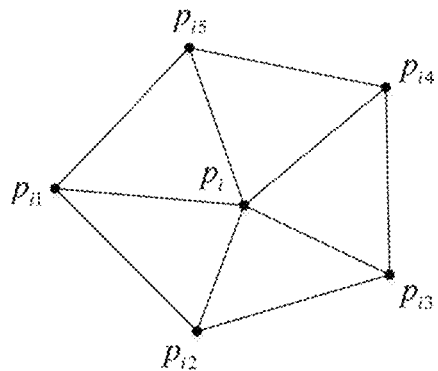

FIG. 4 acquiring a 3D point set $P_z$ within a second spherical neighborhood, wherein an origin of the second spherical neighborhood coincides with the feature point $p$ and the second spherical neighborhood has a calculation radius of $R_z$ performing eigenvalue decomposition on a covariance matrix $cov(P_z)$ of the 3D point set $P_z$ according to the following formula to determine an eigenvector $v$ corresponding to the minimum eigenvalue of the covariance matrix $cov(P_z)$ performing sign disambiguation on the eigenvector $v$ corresponding to the minimum eigenvalue to determine the z axis of the local reference frame

FIG. 5

METHOD AND DEVICE FOR 3D SHAPE MATCHING BASED ON LOCAL REFERENCE FRAME

CROSS-REFERENCE TO RELATED APPLICATIONS

This application is a 371 U.S. National Phase of International Application No. PCT/CN2019/124037, filed Dec. 9, 2019. The entire disclosure of the above application is incorporated herein by reference.

TECHNICAL FIELD

The present application relates to a technology of 3D shape matching, and particularly to a method for 3D shape matching based on a local reference frame, and a device for 3D shape matching based on a local reference frame.

BACKGROUND

With continuous development of 3D scanning and modeling technologies and 3D reconstruction technologies, 3D object recognition has become a research focus in the field of computer vision, and has been widely applied in intelligent monitoring, e-commerce, robots, biomedicine, etc. Regarding 3D shape matching served as the most important step in the 3D object recognition, there are mainly 3D shape matching methods based on global features and 3D shape matching methods based on local features. Although the 3D shape matching methods based on global features are provided with fast speed, the 3D shape matching methods based on local features are more robust to occlusion and clutter and can make subsequent pose estimation more accurate. In the 3D shape matching methods based on local features, describing local features of a 3D point cloud by using a 3D local feature descriptor is a key part of the whole methods, and is also a key factor that determines the accuracy of 3D shape matching or 3D object recognition. In order to establish an accurate and robust 3D local feature descriptor, the key lies in how to establish a repeatable and robust local reference frame for the local features of the 3D point cloud.

In order to maintain distinction and robustness for occlusion and clutter, many 3D local feature descriptors have been proposed and extensively studied. These 3D local feature descriptors may be classified into two categories, namely, the descriptors based on a LRA (Local Reference Axis) and the descriptors based on LRF (Local Reference Frame). The local reference frame is constituted by three orthogonal axes, and the local reference axis only contains a single orientation axis. The local reference axis in which only the single orientation axis is defined can only provide information about radial and elevation directions, which will result in that the 3D local feature descriptor lacks sufficient detailed information. On the contrary, the 3D local feature descriptor with the local reference frame can fully encode spatial distribution and/or geometric information of the 3D local surface by using three axes, which is not only provided with rotation invariance but also greatly enhances distinction of the 3D local feature descriptor.

At present, the local reference frames may be divided into local reference frames based on CA (Covariance Analysis) and local reference frames based on GAs (Geometric Attributes). However, since there will inevitably be some noise interference when 3D point cloud data is acquired through an acquisition device, there will be occlusion and clutter in a plurality of objects in a complex scene, and the change of distances between a 3D sensor and the objects will change point cloud resolution, and the like, then most of the current local reference frames based on covariance analysis are usually provided with correspondingly low repeatability and sign ambiguity, meanwhile the local reference frames based on geometric attributes are susceptible to severe noise and grid resolution. Therefore, it is still a difficult subject to establish a local reference frame that is repeatable, robust, anti-noise, and not affected by grid simplification.

SUMMARY

In order to solve the above technical problems, the following technical solutions are proposed by the present application.

According to a first aspect of the present application, a method for 3D shape matching based on a local reference frame is proposed, and the method includes:

acquiring a 3D point cloud of a real scene;

acquiring a feature point p of the 3D point cloud of the real scene;

establishing a local reference frame for a first spherical neighborhood of the feature point p, here an origin of the first spherical neighborhood coincides with the feature point p and the first spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame, and encoding spatial information within the first spherical neighborhood to acquire 3D local surface information within the first spherical neighborhood; and matching the 3D local surface information within the first spherical neighborhood with 3D local surface information of a target object to perform 3D shape matching;

further, the establishing the local reference frame for the first spherical neighborhood of the feature point includes:

determining the z axis of the local reference frame;

projecting a 3D point set P within the first spherical neighborhood to a plane L orthogonal to the z axis to obtain a projected point set P', here $P=\{p_1, p_2, p_3, \ldots, p_n\}$, $P'=\{p'_1, p'_2, p'_3, \ldots, p'_n\}$, n is the number of 3D points within the first spherical neighborhood, and the plane L is a plane located at z=0;

performing feature transformation on the projected point set P' according to the following formula to acquire a point distribution T provided with a larger variance in certain one direction than the projected point set P':

$$T_i = W_i(p'_i - p) + p,$$

where the parameter $W_i$ in the feature transformation is determined by at least one of a first parameter $w1_i$, a second parameter $w2_i$, and a third parameter $w3_i$, here the first parameter $w1_i$ is associated with a distance from the 3D point $p_i$ to the feature point p, the second parameter $w2_i$ is associated with a distance from the 3D point $p_i$ to the projected point $p'_i$, and the third parameter $w3_i$ is associated with an average distance $\overline{L_i}$ from the 3D point $p_i$ to 1-ring neighborhood points that are neighborhood points adjacent to the 3D point $p_i$, here $T=\{T_i\}$, i=1, 2, 3, ......, n;

performing eigenvalue decomposition on a covariance matrix cov(T) of the point distribution T according to the following formula to determine an eigenvector v' corresponding to a maximum eigenvalue of the covariance matrix cov(T):

$$\text{cov}(T) = \frac{1}{n} \sum\nolimits_{i=1}^{n} (T_i - p)(T_i - p)^T,$$

and performing sign disambiguation on the eigenvector v' corresponding to the maximum eigenvalue according to the following definition to determine the x axis of the local reference frame:

$$x = \begin{cases} v', & v' \cdot \sum\nolimits_{i=1}^{n}(T_i - p) \geq 0 \\ -v', & \text{other situations} \end{cases};$$

and determining a cross product of the z axis and the x axis as the y axis of the local reference frame.

In an embodiment, the step, executed by a processor, of determining the z axis of the local reference frame includes:

acquiring a 3D point set $P_z$ within a second spherical neighborhood, here an origin of the second spherical neighborhood coincides with the feature point p and the second spherical neighborhood has a calculation radius of $R_z$, here $P_z = \{q_1, q_2, q_3, \ldots, q_m\}$, and m is the number of 3D points within the second spherical neighborhood;

performing eigenvalue decomposition on a covariance matrix cov($P_z$) of the 3D point set $P_z$ according to the following formula to determine an eigenvector v corresponding to the minimum eigenvalue of the covariance matrix cov($P_z$):

$$\text{cov}(P_z) = \frac{1}{m} \sum\nolimits_{j=1}^{m} (q_j - \bar{q})(q_j - \bar{q})^T,$$

where $\bar{q}$ is a centroid of the 3D point set $P_z$; and performing sign disambiguation on the eigenvector v corresponding to the minimum eigenvalue according to the following definition to determine the z axis of the local reference frame:

$$z = \begin{cases} v, & \sum\nolimits_{j=1}^{m} v \cdot n_j \geq 0 \\ -v, & \text{other situations} \end{cases},$$

where $n_j$ is a normal vector of the 3D point $q_j$.

In an embodiment, the step, executed by a processor, of determining the calculation radius $R_z$ includes:

acquiring an average grid resolution scene.mr of the real scene and an average grid resolution model.mr of the target object;

determining a radius scale factor δ according to the average grid resolution scene.mr of the real scene and the average grid resolution model.mr of the target object, here the radius scale factor δ is determined as follows:

$$\delta = \frac{scene.mr}{C * model.mr},$$

where C is a constant;

determining the calculation radius $R_z$ as $R_z = \delta R$.

In an embodiment, the parameter $W_i$ in the feature transformation is determined by a product of any two of the first parameter $w1_i$, the second parameter $w2_i$, and the third parameter $w3_i$.

In an embodiment, the parameter $W_i$ in the feature transformation is determined by a product of the first parameter $w1_i$, the second parameter $w2_i$, and the third parameter $w3_i$.

In the above described method, the 3D point cloud of the real scene may be acquired in real time, and the 3D point cloud of the target object may be pre-stored. That is to say, in the above described method, the 3D local surface information of the 3D point cloud acquired by real-time measurement of the real scene may be matched with the 3D local surface information acquired by calculating the pre-stored 3D point cloud of the target object, so as to realize recognition of a shape matching the model of the target object from the 3D point cloud of the real scene.

According to a second aspect of the present application, a method for 3D shape matching based on a local reference frame is proposed, which is similar to the steps of the above described method, and their difference lies in that the 3D point cloud of the target object is pre-stored and the 3D point cloud of the scene may also be pre-stored after being acquired. That is to say, in this method, the 3D local surface information acquired by calculating the 3D point cloud of the pre-stored target object may be matched with the 3D local surface information acquired by calculating the 3D point cloud of the scene, so as to realize recognition of a shape matching the model of the target object from the 3D point cloud of the scene.

According to a third aspect of the present application, a device for 3D shape matching based on a local reference frame is proposed, which includes an acquisition apparatus, a memory and a processor. Among them, the acquisition apparatus is configured to acquire a 3D point cloud of a real scene, a computer program is stored in the memory, and the processor, when executing the computer program, implements the operations of the method described in the first aspect of the present application except for acquiring the 3D point cloud of the real scene.

According to a fourth aspect of the present application, a device for 3D shape matching based on a local reference frame is proposed, which includes a memory and a processor. Among them, a computer program is stored in the memory, and the processor, when executing the computer program, implements the methods described in the first aspect or the second aspect of the present application.

The above description is only a summary of the present application, which cannot be used as a basis for evaluating the contribution of the present application to the prior art. For details, please refer to the description of the specific embodiments of the present application.

In the method and device for 3D shape matching based on the local reference frame proposed in the present application, the established local reference frame is repeatable, robust, and anti-noise by performing feature transformation on the neighborhood points in the neighborhood of each of the feature points of the 3D point cloud, and the established local reference frame is hardly affected by the grid resolution by configuring the calculation radius used to calculate the z axis of the local reference frame to be adaptively adjusted according to the grid resolution. Therefore, even if there is occlusion, clutter and noise interference, or even if the grids of the 3D point cloud of the scene or the target object are simplified, a correspondingly excellent 3D shape matching or recognition result can still be acquired by using the method and device for 3D shape matching based on the local reference frame proposed in the present application.

DESCRIPTION OF THE DRAWINGS

FIG. 3 is a schematic diagram of projecting a 3D point set P in a spherical neighborhood to a plane L orthogonal to the z-axis according to an embodiment of the present application.

FIG. 4 is a schematic diagram of 1-ring neighborhood points of 3D points according to an embodiment of the present application.

FIG. 5 is a flow diagram of determining the z axis of the local reference frame according to an embodiment of the present application.

DETAILED DESCRIPTION

In order to make the objections, technical solutions, and advantages of the present application clearer, the present application is further described below in detail with reference to the accompanying drawings and specific embodiments. It should be understood that the specific embodiments described herein are only used to illustrate the present application, and are not used to limit the present application.

Unless otherwise defined, all technical terms and scientific terms used in this specification have the same meanings as commonly understood by those skilled in the art of the present application. The terms used in the specification of the present application are only aimed to describe specific embodiments, but not to limit the present application. The term "and/or" used in this specification includes any and all combinations of one or more related listed items.

In addition, the terms "first", "second", etc. are only used for descriptive purposes, and cannot be understood as indicating or implying the number or relative importance of a technical feature. The specific embodiments of the present application are described below, and the technical features involved in the described different embodiments may be combined with each other as long as they do not conflict with each other.

As is well-known, 3D point cloud records a surface of a scene or an object in the form of points after scanning the scene or the object, and each of the points is provided with a three-dimensional coordinate. The 3D shape matching is to match a surface of a scene or an object represented by 3D point data with another or more surfaces of scenes or objects represented by 3D point data, so as to further achieve a result of 3D object recognition.

Figure 1:
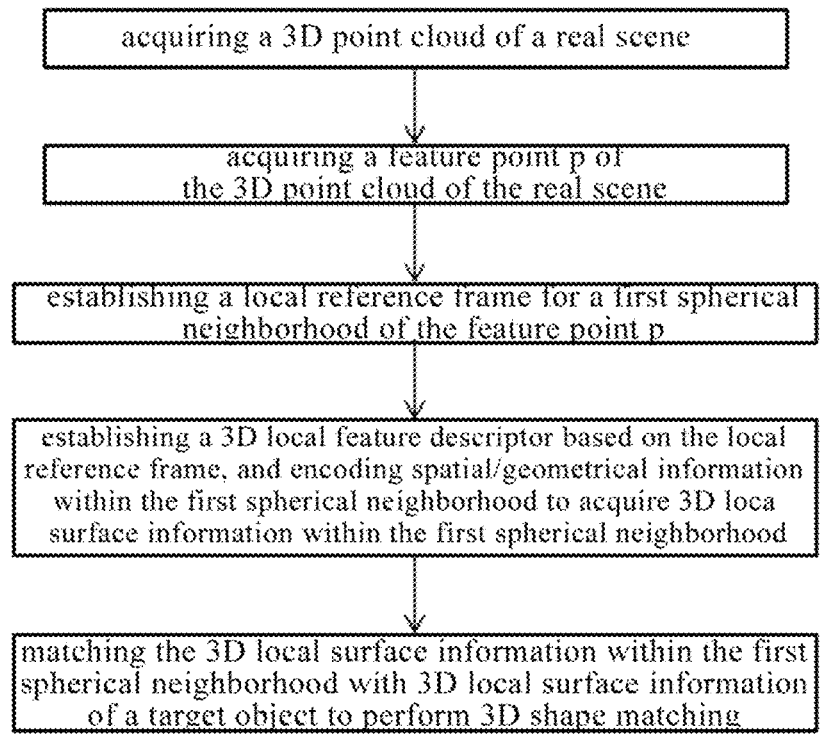
FIG. 1 is a flow diagram of the method for 3D shape matching based on a local reference frame according to an embodiment of the present application.

According to the first aspect of the present application, in an embodiment as shown in FIG. 1, the present application proposes a method for 3D shape matching based on a local reference frame, and the method may include:

acquiring a 3D point cloud of a real scene;

acquiring a feature point p of the 3D point cloud of the real scene;

establishing a local reference frame for a first spherical neighborhood of the feature point p, here an origin of the first spherical neighborhood coincides with the feature point p and the first spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame, and encoding spatial information within the first spherical neighborhood to acquire 3D local surface information within the first spherical neighborhood; and matching the 3D local surface information within the first spherical neighborhood with 3D local surface information of a target object to perform 3D shape matching.

In this embodiment, the real scene may be any scene in real life, especially in industrial applications. The present application does not make specific restrictions on the application scene, as long as it is a scene that requires a 3D shape matching or 3D recognition method. In this embodiment, the 3D point cloud may be acquired in real time, and the 3D point cloud of the target object may be pre-stored, i.e., the target object may be a model used to match the same object in the real scene. That is to say, in this embodiment, the 3D local surface information of the 3D point cloud acquired by real-time measurement of the real scene can be matched with the 3D local surface information acquired by calculating the 3D point cloud of the pre-stored target object, so as to achieve recognition of a shape matching the model of the target object from the 3D point cloud of the real scene.

In this embodiment, the feature point is also called a key point or a point of interest, that is, a feature point provided with a specific shape. The feature points in the 3D point cloud may be acquired by using a method based on a fixed-scale and the method based on an adaptive-scale, or the feature points may be acquired by using any other existing technology, which is not limited herein.

In this embodiment, the 3D local feature descriptor may be any local feature descriptor established based on the local reference frame of the present application, for example, any existing local feature descriptor based on the GA method, which is not limited in the present application.

Figure 2:
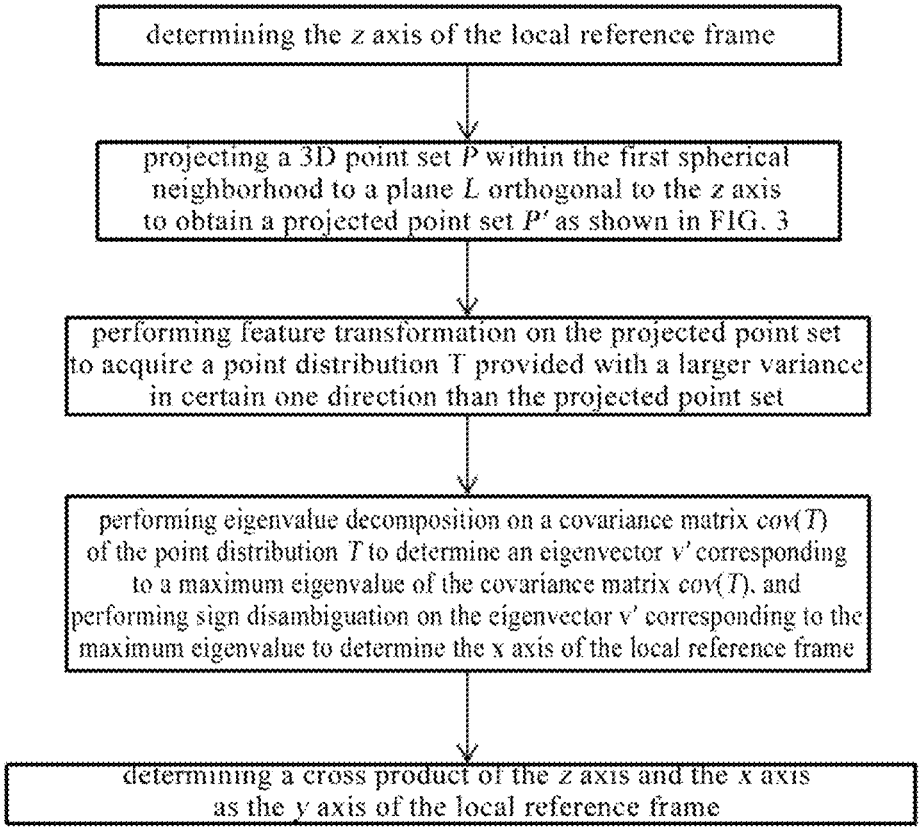
FIG. 2 is a flow diagram of a process of establishing a local reference frame according to an embodiment of the present application.

In an embodiment, as shown in FIG. 2, in order to make the established local reference frame repeatable and robust, the method includes the basic technical features of the above embodiment, and on the basis of the above embodiment, the step of establishing the local reference frame for the first spherical neighborhood of the feature point may include:

determining the z axis of the local reference frame;

projecting a 3D point set P within the first spherical neighborhood to a plane L orthogonal to the z axis to obtain a projected point set P' as shown in FIG. 3, where $P=\{p_1, p_2, p_3, \ldots, p_n\}$, $P'=\{p'_1, p'_2, p'_3, \ldots, p'_n\}$, n is the number of 3D points within the first spherical neighborhood, and the plane L is a plane located at z=0;

performing feature transformation on the projected point set P' according to the following formula to acquire a point distribution T provided with a larger variance in certain one direction than the projected point set P':

$$T_i = W_i(p'_i - p) + p,$$

where the parameter $W_i$ in the feature transformation is determined by at least one of a first parameter $w1_i$, a second parameter $w2_i$, and a third parameter $w3_i$, where the first parameter $w1_i$ is associated with the distance from the 3D point $p_i$ to the feature point p, the second parameter $w2_i$ is associated with the distance from the 3D point $p_i$ to the projected point $p'_i$, and the third parameter $w3_i$ is associated with the average distance $\overline{L}_i$ from the 3D point $p_i$ to 1-ring neighborhood points that are neighborhood points adjacent to the 3D point $p_i$, where $T=\{T_i\}$, $i=1, 2, 3, \ldots, n$;

performing eigenvalue decomposition on a covariance matrix cov(T) of the point distribution T according to the following formula to determine an eigenvector v' corresponding to a maximum eigenvalue of the covariance matrix cov(T):

$$\text{cov}(T) = \frac{1}{n}\sum_{i=1}^{n}(T_i - p)(T_i - p)^T,$$

and performing sign disambiguation on the eigenvector v' corresponding to the maximum eigenvalue according to the following definition to determine the x axis of the local reference frame:

$$x = \begin{cases} v', & v' \cdot \sum_{i=1}^{n}(T_i - p) \geq 0 \\ -v', & \text{other situations} \end{cases};$$

and determining a cross product of the z axis and the x axis as the y axis of the local reference frame.

It is worth noting that the point set P' as a whole is more stable in this direction if the variance of the point set P' in the certain one direction is greater. The x axis of the local reference frame should be a coordinate axis that makes the point set P' more stable in the x axis direction, therefore the local reference frame acquired by the above method is more robust.

In this embodiment, the point distribution T provided with a larger variance in the certain direction than the projected point set P' is acquired by performing planar projection and feature transformation on the neighborhood points within the neighborhood of the feature point of the 3D point cloud, and the local reference frame established by analyzing the point distribution T provided with the larger variance in the certain one direction is repeatable, robust and anti-noise.

In this embodiment, the first parameter $w1_i$ associated with the distance from the 3D point $p_i$ to the feature point p may be used to reduce the influence of occlusion and clutter on the projected point set P', the second parameter $w2_i$ associated with the distance from the 3D point $p_i$ to the projected point $p'_i$ may be used to make the point distribution of the projected point set P' more characteristic, and the third parameter $w3_i$ associated with the average distance $\overline{L_i}$ from the 3D point $p_i$ to its 1-ring neighboring points may be used to reduce the influence of an outlier on the projected point set P'.

As a preferred embodiment, the first parameter $w1_i$ and the distance from the 3D point $p_i$ to the feature point p are required to satisfy the following relationship:

$$w1_i = R - \|p_i - p\|.$$

As a preferred embodiment, the second parameter $w2_i$ and the distance from the 3D point $p_i$ to the projected point $p'_i$ are required to satisfy the following relationship:

$$h_i = \|p_i - p'_i\| = |(p_i - p) \cdot z|$$

$$w2_i = e^{\frac{(\max(H) - h_i)^2}{2\sigma^2}},$$

where H={$h_i$}, and σ represents a standard deviation of the above Gaussian function.

As a preferred embodiment, the standard deviation σ may be: σ=max(H)/9.

As a preferred embodiment, the third parameter $w3_i$ and the average distance $\overline{L_i}$ from the 3D point $p_i$ to its 1-ring neighboring points are required to satisfy the following relationship:

$$\overline{L_i} = \frac{1}{r}\sum_{k=1}^{r}\|p_i - p_{ik}\|$$

$$w3_i = \begin{cases} 1, & 0 < \overline{L_i} < \frac{s}{n}\sum_{g=1}^{n}\overline{L_g} \\ 0, & \text{other situations} \end{cases},$$

where r is the number of the 1-ring neighboring points, and s is a constant.

As an example, there are r neighborhood points $p_{i1}$, $p_{i2}$, . . . . . . , $p_{ir}$ of a certain 3D point $p_i$ in its 1-ring neighborhood. As shown in FIG. 4, as a preferred embodiment, the number r of the 1-ring neighboring points may be 5, that is, the certain 3D point $p_i$ is provided with r neighboring points $p_{i1}$, $P_{i2}$, $P_{i3}$, $P_{i4}$, and $P_{i5}$ in its 1-ring neighborhood.

As a preferred embodiment, the constant s may be equal to 4.

As a preferred embodiment, the parameter $W_i$ in the feature transformation may be commonly determined by a product of any two of the first parameter $w1_i$, the second parameter $w2_i$, and the third parameter $w3_i$. For example, the point distribution T provided with the larger variance in the certain one direction may have the following plurality of forms: $T_i = w1_i w2_i (p'_i - p) + p$, $T_i = w1_i w3_i (p'_i - p) + p$, or $T_i = w2_i w3_i (p'_i - p) + p$.

As a preferred embodiment, the parameter $W_i$ in the feature transformation may be commonly determined by a product of the first parameter $w1_i$, the second parameter $w2_i$, and the third parameter $w3_i$. For example, the point distribution T provided with the larger variance in the certain direction may be: $T_i = w1_i w2_i w3_i (p'_i - p) + p$.

In the above-mentioned preferred embodiment, the more factors used to determine the point distribution T provided with the larger variance in the certain direction, the better the technical effect, and the more robust the acquired local reference frame.

In an embodiment, as shown in FIG. 5, the method includes the basic technical features of the foregoing embodiment, and on the basis of the foregoing embodiment, the step of determining the z axis of the local reference frame may include:

acquiring a 3D point set $P_z$ within a second spherical neighborhood, where an origin of the second spherical neighborhood coincides with the feature point p and the second spherical neighborhood has a calculation radius of $R_z$, where $P_z$={$q_1$, $q_2$, $q_3$, . . . . . . , $q_m$}, and m is the number of 3D points within the second spherical neighborhood;

performing eigenvalue decomposition on a covariance matrix cov($P_z$) of the 3D point set $P_z$ as shown in the following formula to determine an eigenvector v corresponding to the minimum eigenvalue of the covariance matrix cov($P_z$):

$$\text{cov}(P_Z) = \frac{1}{m}\sum_{j=1}^{m}(q_j - \overline{q})(q_j - \overline{q})^T,$$

where $\overline{q}$ is a centroid of the 3D point set $P_z$; and performing sign disambiguation on the eigenvector v corresponding to the minimum eigenvalue according to the following definition to determine the z axis of the local reference frame:

$$z = \begin{cases} v, & \sum_{j=1}^{m} v \cdot n_j \geq 0 \\ -v, & \text{other situations} \end{cases},$$

where $n_j$ is a normal vector of the 3D point $q_j$.

As a preferred embodiment, the calculation radius $R_z$ may be not equal to the support radius R, so that the z axis of the local reference frame is more robust to occlusion and clutter.

As a preferred embodiment, the calculated radius $R_z$ is equal to one third of the support radius R.

Figure 6:
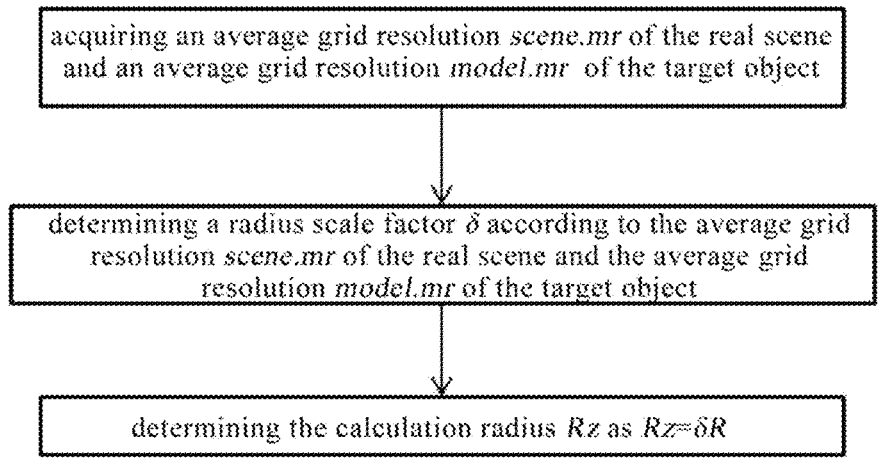
FIG. 6 is a flow diagram of determining a calculation radius $R_z$ of the z axis according to an embodiment of the present application.

Because different 3D grid resolutions will lead to the 3D point clouds acquired with different densities during actual acquisition of the 3D point clouds, the larger the grid resolution, the larger the scale of the 3D point cloud, and the greater the number of 3D points on a surface of a scene or an object in the same space. Moreover, when the grid resolution of the object model is lower than that of the scene, the neighborhood points acquired in the real scene will be less than the neighborhood points of the model by using the same radius. Further, when the points are very sparse, the performance of the 3D shape matching will be greatly negatively affected and thus become very poor if the z axis of the local reference frame of the scene is calculated by using a relatively small radius of the neighborhood. Therefore, the present application has proposed an adaptive scale factor which is used to determine the calculation radius $R_z$, so that the acquired z axis is not only robust to occlusion, but also robust to different grid samplings. In an embodiment, as shown in FIG. 6, the method includes the basic technical features of the foregoing embodiment, and on the basis of the foregoing embodiment, the step of determining the calculation radius $R_z$ may include:

acquiring an average grid resolution scene.mr of the real scene and an average grid resolution model.mr of the target object; determining a radius scale factor δ according to the average grid resolution scene.mr of the real scene and the average grid resolution model.mr of the target object, where the radius scale factor δ is determined as follows:

$$\delta = \frac{scene.mr}{C * model.mr},$$

where C is a constant;
determining the calculation radius $R_z$ as $R_z = \delta R$.

In this embodiment, the calculation radius used to calculate the z axis of the local reference frame is configured to be adaptively adjusted according to the grid resolution, so that the established local reference frame can be hardly affected by the grid resolution.

As a preferred embodiment, the constant C may be equal to 3.

In an embodiment, the method includes the basic technical features of the foregoing embodiment, and the method, on the basis of the foregoing embodiment, may further include the following steps before determining the calculation radius $R_z$ of the real scene:

predetermining at least two radius scale factors, and predetermining local reference frames and 3D local feature descriptors corresponding to the at least two radius scale factors;

storing the predetermined at least two radius scale factors and the predetermined 3D local feature descriptors at different locations of a hash table.

In an embodiment, the method includes the basic technical features of the foregoing embodiment, and the method, on the basis of the foregoing embodiment, may further include:

looking up the at least two radius scale factors in the hash table by using the radius scale factor δ determined according to the average grid resolution scene.mr of the real scene and the average grid resolution model.mr of the target object, and determining a 3D local feature descriptor corresponding to one scale factor in the hash table as the final 3D local feature descriptor, where the one scale factor in the hash table is most approaches the radius scale factor δ.

According to the second aspect of the present application, an embodiment of the present application proposes a method for 3D shape matching based on a local reference frame, and the method may include:

acquiring a 3D point cloud of an target object;
acquiring a feature point p of the 3D point cloud of the target object;

establishing a local reference frame for a first spherical neighborhood of the feature point p, here an origin of the first spherical neighborhood coincides with the feature point p and the first spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame, and encoding spatial information within the first spherical neighborhood to acquire 3D local surface information within the first spherical neighborhood; and matching the 3D local surface information within the first spherical neighborhood with 3D local surface information of an scene to perform 3D shape matching;

among the above steps, the step of establishing the local reference frame for the first spherical neighborhood of the feature point may include:

determining the z axis of the local reference frame;
projecting a 3D point set P within the first spherical neighborhood to a plane L orthogonal to the z axis to obtain a projected point set P', where $P=\{p_1, p_2, p_3, \ldots, p_n\}$, $P'=\{p'_1, p'_2, p'_3, \ldots, p'_n\}$, n is the number of 3D points within the first spherical neighborhood, and the plane L is a plane located at z=0;

performing feature transformation on the projected point set P' according to the following formula to acquire a point distribution T provided with a larger variance in certain one direction than the projected point set P':

$$T_i = W_i(p'_i - p) + p,$$

where the parameter $W_i$ in the feature transformation is determined by at least one of a first parameter $w1_i$, a second parameter $w2_i$, and a third parameter $w3_i$, where the first parameter $w1_i$ is associated with the distance from the 3D point $p_i$ to the feature point p, the second parameter $w2_i$ is associated with the distance from the 3D point $p_i$ to the projected point $p'_i$, and the third parameter $w3_i$ is associated with the average distance $\overline{L_i}$ from the 3D point $p_i$ to 1-ring neighborhood points that are neighborhood points adjacent to the 3D point $p_i$, where $T=\{T_i\}$, i=1, 2, 3, ......, n;

performing eigenvalue decomposition on a covariance matrix cov(T) of the point distribution T according to the following formula to determine an eigenvector v' corresponding to a maximum eigenvalue of the covariance matrix cov(T):

$$\mathrm{cov}(T) = \frac{1}{n}\sum_{i=1}^{n}(T_i - p)(T_i - p)^T,$$

and performing sign disambiguation on the eigenvector v' corresponding to the maximum eigenvalue according to the following definition to determine the x axis of the local reference frame:

$$x = \begin{cases} v', & v' \cdot \sum_{i=1}^{n}(T_i - p) \geq 0 \\ -v', & \text{other situations} \end{cases};$$

and determining a cross product of the z axis and the x axis as the y axis of the local reference frame.

The steps of the embodiments of the second aspect of the present application are similar to the steps of the embodiments of the first aspect, except that the 3D point cloud of the target object is pre-stored and the 3D point cloud of the scene may also be pre-stored after being acquired. That is to say, in this method, the 3D local surface information acquired by calculating the 3D point cloud of the pre-stored target object may be matched with the 3D local surface information acquired by calculating the 3D point cloud of the scene, so as to realize recognition of a shape matching the model of the target object from the 3D point cloud of the scene. For other technical features of the second aspect of the present application, reference may be made to the technical features in the specific embodiments of the first aspect of the present application, which will not be repeated herein again.

Figure 7:
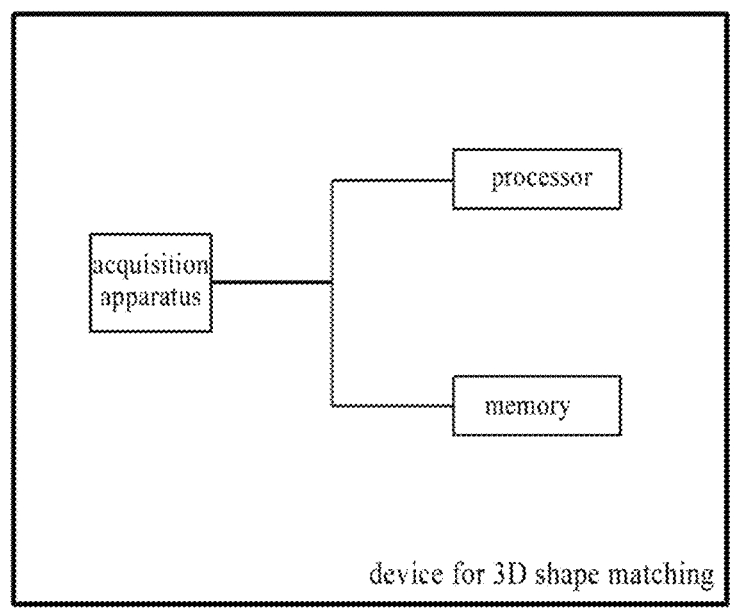
FIG. 7 is a schematic structural diagram of the device for 3D shape matching based on a local reference frame according to an embodiment of the present application.

According to the third aspect of the present application, in an embodiment as shown in FIG. 7, a device for 3D shape matching based on a local reference frame is proposed, which may include an acquisition apparatus, a memory and a processor. Among them, the acquisition apparatus is configured to acquire a 3D point cloud of a real scene, a computer program is stored in the memory, and the processor, when executing the computer program, implements the operations of the method described in the first aspect of the present application except for acquiring the 3D point cloud of the real scene. In this embodiment, the acquisition apparatus may be a 3D scanning apparatus, a laser scanning apparatus, an acquisition apparatus using structured light, or any other apparatus that can acquire the 3D point cloud of the real scene, and the memory may be any storage apparatus with a software storage function, and the processor may be any processor that may execute the computer program and instruct a certain execution subject to perform related operations. In an embodiment, the 3D point cloud data acquired by the acquisition apparatus may be directly or indirectly stored in the memory, or may be accessed by the memory or the processor. In an embodiment, the processor may directly or indirectly control the acquisition apparatus to acquire the 3D point cloud data. For other technical features of the third aspect of the present application, reference may be made to the technical features in the specific embodiments of the first aspect of the present application, which will not be repeated herein again.

According to the fourth aspect of the present application, an embodiment proposes a device for 3D shape matching based on a local reference frame, which includes a memory and a processor. Among them, a computer program is stored in the memory, and the processor, when executing the computer program, implements the embodiments of the methods described in the first aspect or the second aspect of the present application. For other technical features of the fourth aspect of the present application, reference may be made to the technical features in the specific embodiments of the first, second or third aspect of the present application, which will not be repeated herein again.

The specific embodiments of the present application described above do not constitute a limitation on the protection scope of the present application. Any amendment, equivalent replacement and improvement made within the principles of the present application shall be included in the protection scope of the present application.

What is claimed is:

1. A method for 3D shape matching based on a local reference frame, comprising:

acquiring a 3D point cloud of a real scene;

acquiring a feature point p of the 3D point cloud of the real scene;

establishing a local reference frame for a first spherical neighborhood of the feature point p, wherein an origin of the first spherical neighborhood coincides with the feature point p and the first spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame, and encoding spatial information within the first spherical neighborhood to acquire 3D local surface information within the first spherical neighborhood; and matching the 3D local surface information within the first spherical neighborhood with 3D local surface information of a target object to perform 3D shape matching;

wherein the step of establishing the local reference frame for the first spherical neighborhood of the feature point comprises:

determining the z axis of the local reference frame;

projecting a 3D point set P within the first spherical neighborhood to a plane L orthogonal to the z axis to obtain a projected point set P', wherein P={$p_1$, $p_2$, $p_3$, ......, $p_n$}, P'={$p'_1$, $p'_2$, $p'_3$, ......, $p'_n$}, n is the number of 3D points within the first spherical neighborhood, and the plane L is a plane located at z=0;

performing feature transformation on the projected point set P' according to the following formula to acquire a point distribution T provided with a larger variance in certain one direction than the projected point set P':

$$T_i = W_i(p'_i - p) + p,$$

wherein the parameter $W_i$ in the feature transformation is determined by at least one of a first parameter $w1_i$, a second parameter $w2_i$, and a third parameter $w3_i$, wherein the first parameter $w1_i$ is associated with a distance from the 3D point $p_i$ to the feature point p, the second parameter $w2_i$ is associated with a distance from the 3D point $p_i$ to the projected point $p'_i$, and the third parameter $w3_i$ is associated with an average distance $\overline{L_i}$ from the 3D point $p_i$ to 1-ring neighborhood points that are neighborhood points adjacent to the 3D point $p_i$, wherein T={$T_i$}, i=1, 2, 3, ......, n;

performing eigenvalue decomposition on a covariance matrix cov(T) of the point distribution T according to the following formula to determine an eigenvector v' corresponding to a maximum eigenvalue of the covariance matrix cov(T):

$$\mathrm{cov}(T) = \frac{1}{n}\Sigma_{i=1}^{n}(T_i - p)(T_i - p)^T,$$

and performing sign disambiguation on the eigenvector v' corresponding to the maximum eigenvalue according to the following definition to determine the x axis of the local reference frame:

$$x = \begin{cases} v', & v' \cdot \sum_{i=1}^{m}(T_i - p) \geq 0 \\ -v', & \text{other situations} \end{cases};$$

and determining a cross product of the z axis and the x axis as the y axis of the local reference frame.

2. The method for 3D shape matching according to claim 1, wherein the step of determining the z axis of the local reference frame comprises:

acquiring a 3D point set $P_z$ within a second spherical neighborhood, wherein an origin of the second spherical neighborhood coincides with the feature point p and the second spherical neighborhood has a calculation radius of $R_z$, wherein $P_z=\{q_1, q_2, q_3, \ldots, q_m\}$, and m is the number of 3D points within the second spherical neighborhood;

performing eigenvalue decomposition on a covariance matrix $\mathrm{cov}(P_z)$ of the 3D point set $P_z$ according to the following formula to determine an eigenvector v corresponding to a minimum eigenvalue of the covariance matrix $\mathrm{cov}(P_z)$:

$$\mathrm{cov}(P_z) = \frac{1}{m}\sum_{j=1}^{m}(q_j - \overline{q})(q_j - \overline{q})^T,$$

where $\overline{q}$ is a centroid of the 3D point set $P_z$; and performing sign disambiguation on the eigenvector v corresponding to the minimum eigenvalue according to the following definition to determine the z axis of the local reference frame:

$$z = \begin{cases} v, & \sum_{j=1}^{m} v \cdot n_j \geq 0 \\ -v, & \text{other situations} \end{cases},$$

where $n_j$ is a normal vector of the 3D point $q_j$.

3. The method for 3D shape matching according to claim 2, wherein the calculation radius $R_z$ is not equal to the support radius R.

4. The method for 3D shape matching according to claim 2, wherein the step of determining the calculation radius $R_z$ comprises:

acquiring an average grid resolution scene.mr of the real scene and an average grid resolution model.mr of the target object;

determining a radius scale factor $\delta$ according to the average grid resolution scene.mr of the real scene and the average grid resolution model.mr of the target object, wherein the radius scale factor $\delta$ is determined as follows:

$$\delta = \frac{scene.mr}{C * model.mr},$$

where C is a constant;

determining the calculation radius $R_z$ as $R_z = \delta R$.

5. The method for 3D shape matching according to claim 4, wherein the method, before determining the calculation radius $R_z$ of the real scene, further comprises:

predetermining at least two radius scale factors, and predetermining local reference frames and 3D local feature descriptors corresponding to the at least two radius scale factors;

storing the predetermined at least two radius scale factors and the predetermined 3D local feature descriptors at different locations of a hash table.

6. The method for 3D shape matching according to claim 5, wherein the method further comprises:

looking up the at least two radius scale factors in the hash table by using the radius scale factor $\delta$ determined according to the average grid resolution scene.mr of the real scene and the average grid resolution model.mr of the target object, and determining a 3D local feature descriptor corresponding to one scale factor in the hash table as the final 3D local feature descriptor, wherein the one scale factor in the hash table is most approaches the radius scale factor $\delta$.

7. The method for 3D shape matching according to claim 1, wherein the parameter $W_i$ in the feature transformation is determined by a product of any two of the first parameter $w1_i$, the second parameter $w2_i$, and the third parameter $w3_i$.

8. The method for 3D shape matching according to claim 1, wherein the parameter $W_i$ in the feature transformation is determined by a product of the first parameter $w1_i$, the second parameter $w2_i$, and the third parameter $w3_i$.

9. The method for 3D shape matching according to claim 1, wherein the first parameter $w1_i$ and the distance from the 3D point $p_i$ to the feature point $p'_i$ are required to satisfy the following relationship:

$$w1_i = R - \|p_i - p\|.$$

10. The method for 3D shape matching according to claim 1, wherein the second parameter $w2_i$ and the distance from the 3D point $p_i$ to the projected point $p'_i$ are required to satisfy the following relationship:

$$h_i = \|p_i - p'_i\| = |(p_i - p) \cdot z|$$

$$w2_i = e^{-\frac{(max(H)-h_i)^2}{2\sigma^2}},$$

where $H=\{h_i\}$, and $\sigma$ represents a standard deviation of the above Gaussian function.

11. The method for 3D shape matching according to claim 1, wherein the third parameter $w3_i$ and the average distance $\overline{L}_i$ from the 3D point $p_i$ to the l-ring neighboring points are required to satisfy the following relationship:

$$\overline{L}_l = \frac{1}{r}\sum_{k=1}^{r}\|p_i - p_{ik}\|$$

$$w3_i = \begin{cases} 1, & 0 < \overline{L}_l < \frac{s}{n}\sum_{g=1}^{n}\overline{L}_g \\ 0, & \text{other situations} \end{cases},$$

where r is the number of the l-ring neighboring points, and s is a constant.

12. A method for 3D shape matching based on a local reference frame, comprising:

acquiring a 3D point cloud of a target object;

acquiring a feature point p of the 3D point cloud of the target object;

establishing a local reference frame for a first spherical neighborhood of the feature point p, wherein an origin of the first spherical neighborhood coincides with the feature point p and the first spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame, and encoding spatial information within the first spherical neighborhood to acquire 3D local surface information within the first spherical neighborhood; and matching the 3D local surface information within the first spherical neighborhood with 3D local surface information of a scene to perform 3D shape matching;

wherein the step of establishing the local reference frame for the first spherical neighborhood of the feature point comprises:

determining the z axis of the local reference frame;

projecting a 3D point set P within the first spherical neighborhood to a plane L orthogonal to the z axis to obtain a projected point set P', wherein $P=\{p_1, p_2, p_3, \ldots, p_n\}$, $P'=\{p'_1, p'_2, p'_3, \ldots, p'_n\}$, n is the number of 3D points within the first spherical neighborhood, and the plane L is a plane located at z=0;

performing feature transformation on the projected point set P' according to the following formula to acquire a point distribution T provided with a larger variance in certain one direction than the projected point set P':

$$T_i = W_i(p'_i - p) + p,$$

wherein the parameter $W_i$ in the feature transformation is determined by at least one of a first parameter $w1_i$, a second parameter $w2_i$, and a third parameter $w3_i$, wherein the first parameter $w1_i$ is associated with a distance from the 3D point $p_i$ to the feature point p, the second parameter $w2_i$ is associated with a distance from the 3D point $p_i$ to the projected point $p'_i$, and the third parameter $w3_i$ is associated with an average distance $\overline{L_1}$ from the 3D point $p_i$ to 1-ring neighborhood points that are neighborhood points adjacent to the 3D point $p_i$, wherein $T=\{T_i\}$, i=1, 2, 3, ......, n;

performing eigenvalue decomposition on a covariance matrix cov(T) of the point distribution T according to the following formula to determine an eigenvector v' corresponding to a maximum eigenvalue of the covariance matrix cov(T):

$$\text{cov}(T) = \frac{1}{n}\sum_{k=1}^{m}(T_i - p)(T_i - p)^T,$$

and performing sign disambiguation on the eigenvector v' corresponding to the maximum eigenvalue according to the following definition to determine the x axis of the local reference frame:

$$x = \begin{cases} v', & v' \cdot \sum_{i=1}^{m}(T_i - p) \geq 0 \\ -v', & \text{other situations} \end{cases};$$

and determining a cross product of the z axis and the x axis as the y axis of the local reference frame.

13. The method for 3D shape matching according to claim 12, wherein the step of determining the z axis of the local reference frame comprises:

acquiring a 3D point set $P_z$ within a second spherical neighborhood, wherein an origin of the second spherical neighborhood coincides with the feature point p and the second spherical neighborhood has a calculation radius of $R_z$, wherein $P_z=\{q_1, q_2, q_3, \ldots, q_m\}$, and m is the number of 3D points within the second spherical neighborhood;

performing eigenvalue decomposition on a covariance matrix $\text{cov}(P_z)$ of the 3D point set $P_z$ according to the following formula to determine an eigenvector v corresponding to a minimum eigenvalue of the covariance matrix $\text{cov}(P_z)$:

$$\text{cov}(P_z) = \frac{1}{m}\sum_{j=1}^{m}(q_j - \overline{q})(q_j - \overline{q})^T,$$

where $\overline{q}$ is a centroid of the 3D point set $P_z$; and performing sign disambiguation on the eigenvector v corresponding to the minimum eigenvalue according to the following definition to determine the z axis of the local reference frame:

$$z = \begin{cases} v, & \sum_{j=1}^{m} v \cdot n_j \geq 0 \\ -v, & \text{other situations} \end{cases},$$

where $n_j$ is a normal vector of the 3D point $q_j$.

14. The method for 3D shape matching according to claim 13, wherein the step of determining the calculation radius $R_z$ comprises:

acquiring an average grid resolution scene.mr of the real scene and an average grid resolution model.mr of the target object;

determining a radius scale factor δ according to the average grid resolution scene.mr of the real scene and the average grid resolution model.mr of the target object, wherein the radius scale factor δ is determined as follows:

$$\delta = \frac{\text{scene.mr}}{C * \text{model.mr}},$$

where C is a constant;

determining the calculation radius $R_z$ as $R_z = \delta R$.

15. The method for 3D shape matching according to claim 12, wherein the parameter $W_i$ in the feature transformation is determined by a product of any two of the first parameter $w1_i$, the second parameter $w2_i$, and the third parameter $w3_i$.

16. The method for 3D shape matching according to claim 12, wherein the parameter $W_i$ in the feature transformation is determined by a product of the first parameter $w1_i$, the second parameter $w2_i$, and the third parameter $w3_i$.

17. A device for 3D shape matching based on a local reference frame, comprising an acquisition apparatus, a memory and a processor, wherein the acquisition apparatus is configured to acquire a 3D point cloud of a real scene, a computer program is stored in the memory, and the processor, when executing the computer program, implements the following operations of:

acquiring a feature point p of the 3D point cloud of the real scene;

establishing a local reference frame for a first spherical neighborhood of the feature point p, wherein an origin of the first spherical neighborhood coincides with the feature point p and the first spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame, and encoding spatial information within the first spherical neighborhood to acquire 3D local surface information within the first spherical neighborhood; and matching the 3D local surface information within the first spherical neighborhood with 3D local surface information of a target object to perform 3D shape matching;

wherein the step of establishing the local reference frame for the first spherical neighborhood of the feature point comprises:

determining the z axis of the local reference frame;

projecting a 3D point set P within the first spherical neighborhood to a plane L orthogonal to the z axis to obtain a projected point set P', wherein P={$p_1$, $p_2$, $p_3$, ......, $p_n$}, P'={$p'_1$, $p'_2$, $p'_3$, ......, $p'_n$}, n is the number of 3D points within the first spherical neighborhood, and the plane L is a plane located at z=0;

performing feature transformation on the projected point set P' according to the following formula to acquire a point distribution T provided with a larger variance in certain one direction than the projected point set P':

$$T_i = W_i(p'_i - p) + p,$$

wherein the parameter $W_i$ in the feature transformation is determined by at least one of a first parameter $w1_i$, a second parameter $w2_i$, and a third parameter $w3_i$, wherein the first parameter $w1_i$ is associated with a distance from the 3D point $p_i$ to the feature point p, the second parameter $w2_i$ is associated with a distance from the 3D point $p_i$ to the projected point $p'_i$, and the third parameter $w3_i$ is associated with an average distance $\overline{L_1}$ from the 3D point $p_i$ to 1-ring neighborhood points that are neighborhood points adjacent to the 3D point $p_i$, wherein T={$T_i$}, i=1, 2, 3, ......, n;

performing eigenvalue decomposition on a covariance matrix cov(T) of the point distribution T according to the following formula to determine an eigenvector v' corresponding to a maximum eigenvalue of the covariance matrix cov(T):

$$\text{cov}(T) = \frac{1}{n}\sum_{i=1}^{n}(T_i - p)(T_i - p)^T,$$

and performing sign disambiguation on the eigenvector v' corresponding to the maximum eigenvalue according to the following definition to determine the x axis of the local reference frame:

$$x = \begin{cases} v', & v' \cdot \sum_{i=1}^{n}(T_i - p) \geq 0 \\ -v', & \text{other situations} \end{cases};$$

and determining a cross product of the z axis and the x axis as the y axis of the local reference frame.

18. The device for 3D shape matching according to claim 17, wherein the step, executed by the processor, of determining the z axis of the local reference frame comprises:

acquiring a 3D point set $P_z$ within a second spherical neighborhood, wherein an origin of the second spherical neighborhood coincides with the feature point p and the second spherical neighborhood has a calculation radius of $R_z$, wherein $P_z$={$q_1$, $q_2$, $q_3$, ......, $q_m$}, and m is the number of 3D points within the second spherical neighborhood;

performing eigenvalue decomposition on a covariance matrix cov($P_z$) of the 3D point set $P_z$ according to the following formula to determine an eigenvector v corresponding to a minimum eigenvalue of the covariance matrix cov($P_z$):

$$\text{cov}(P_z) = \frac{1}{m}\sum_{j=1}^{m}(q_j - \overline{q})(q_j - \overline{q})^T,$$

where $\overline{q}$ is a centroid of the 3D point set $P_z$; and performing sign disambiguation on the eigenvector v corresponding to the minimum eigenvalue according to the following definition to determine the z axis of the local reference frame:

$$z = \begin{cases} v, & \sum_{j=1}^{m} v \cdot n_j \geq 0 \\ -v, & \text{other situations} \end{cases},$$

where $n_j$ is a normal vector of the 3D point $q_j$.

19. The device for 3D shape matching according to claim 18, wherein the step, executed by the processor, of determining the calculation radius $R_z$ comprises:

acquiring an average grid resolution scene.mr of the real scene and an average grid resolution model.mr of the target object;

determining a radius scale factor δ according to the average grid resolution scene.mr of the real scene and the average grid resolution model.mr of the target object, wherein the radius scale factor δ is determined as follows:

$$\delta = \frac{\text{scene.mr}}{C * \text{model.mr}},$$

where C is a constant;

determining the calculation radius $R_z$ as $R_z = \delta R$.

20. The device for 3D shape matching according to claim 17, wherein the parameter $W_i$ in the feature transformation is determined by a product of the first parameter $w1_i$, the second parameter $w2_i$, and the third parameter $w3_i$.

* * * * *